(12) United States Patent
Dintner et al.

(10) Patent No.: US 6,250,707 B1
(45) Date of Patent: Jun. 26, 2001

(54) TAILGATE OF A MOTOR VEHICLE

(75) Inventors: Thomas Dintner, Fürstenfeldbruck; Stefan Miklosi, Munich; Thomas Schott, Fürstenfeldbruck, all of (DE)

(73) Assignee: Webasto Vehicle Systems International GmbH, Stockdorf (DE)

( * ) Notice: Subject to any disclaimer, the term of this patent is extended or adjusted under 35 U.S.C. 154(b) by 0 days.

(21) Appl. No.: 09/615,075

(22) Filed: Jul. 12, 2000

(30) Foreign Application Priority Data

Jul. 12, 1999 (DE) .............................................. 199 32 501
Jul. 12, 1999 (DE) .............................................. 199 32 500

(51) Int. Cl.[7] .................................................. B62D 25/10
(52) U.S. Cl. ................. 296/76; 296/146.12; 296/107.08; 49/248; 49/246
(58) Field of Search ................................ 296/76, 146.12, 296/107.08; 49/248, 246

(56) References Cited

U.S. PATENT DOCUMENTS

| | | | |
|---|---|---|---|
| 1,744,199 | * 8/1930 | Good | 296/76 |
| 1,748,736 | * 2/1930 | Selje | 296/107.08 |
| 1,933,623 | * 11/1933 | Gordon | 296/76 |
| 2,024,049 | * 12/1935 | Mahon | 296/76 |
| 2,552,898 | * 5/1951 | Lenci et al. | 296/76 |
| 2,594,643 | * 4/1952 | Gustisha | 296/76 |
| 4,818,009 | * 4/1989 | Muscat | 296/107.08 |
| 4,966,403 | * 10/1990 | Nordstrom | 296/76 |
| 5,551,743 | 9/1996 | Klein et al. . | |
| 5,823,606 | * 10/1998 | Schenk et al. | 296/107.08 |
| 6,010,178 | * 1/2000 | Hahn et al. | 296/107.08 |
| 6,062,628 | * 5/2000 | Guillez | 296/76 |
| 6,092,335 | * 7/2000 | Queveau et al. | 296/76 |
| 6,145,915 | * 11/2000 | Queveau et al. | 296/107.08 |

FOREIGN PATENT DOCUMENTS

| | | |
|---|---|---|
| 92 14 231 | 4/1994 | (DE) . |
| 43 22 285 | 6/1994 | (DE) . |
| 44 45 944 | 4/1996 | (DE) . |
| 197 14 105 | 10/1998 | (DE) . |
| 197 56 981 | 7/1999 | (DE) . |
| 298 04 387 | 7/1999 | (DE) . |
| 0 654 573 | 5/1995 | (EP) . |

* cited by examiner

*Primary Examiner*—D. Glenn Dayoan
*Assistant Examiner*—Kiran B. Patel
(74) *Attorney, Agent, or Firm*—Nixon Peabody LLP; David S. Safran

(57) ABSTRACT

A tailgate of a motor vehicle which can be selectively pivoted as the trunk lid around a front pivot axis by a front four-bar mechanism which has two levers or can be pivoted as the lid of a roof receiver for the folding roof around a rear pivot axis by a rear four-bar mechanism which has two levers, has a lever that is part of both the front four-bar mechanism and the rear four-bar mechanism.

14 Claims, 8 Drawing Sheets

TAILGATE OF A MOTOR VEHICLE

BACKGROUND OF THE INVENTION

1. Field of the Invention

The invention relates to the tailgate of a motor vehicle which can be swung both as a trunk lid and as the lid of a receiver for a folding roof.

2. Description of Related Art

German Patent DE 44 45 944 C1 shows a motor vehicle with a roof structure in which a roof part and a rear window part can be folded together via a forced control which is mounted on the body so that they can be stowed in the top area of a rear trunk space. To do this, under the trunk lid there is a U-shaped auxiliary frame, the transversely running leg of the U-shaped auxiliary frame being located in the rearmost and lowermost end area of the trunk. The side legs of the U-shaped auxiliary frame are each connected via a seven-joint scissors lifting arrangement to the front end of the trunk lid. To load the trunk, the trunk lid is opened and closed via the two-sided scissors lifting arrangements. To stow the folded-together roof arrangement, the trunk lid together with the auxiliary frame is pivoted upward and to the rear around the transversely running leg of the U-shaped auxiliary frame via gas compression springs and hydraulic cylinders. A transition area between the tailgate and the rear seat is often covered by a multi-part cover with its own complex actuation mechanism, as is known, for example, from published German Patent Application DE 197 14 105 A1.

This arrangement is disadvantageous since it requires a large number of moving parts. Furthermore, the configuration of the seal of the lower rear transverse edge of the trunk lid relative to the body is problematic, since the rotary motion of the trunk lid, when the roof arrangement is stowed in the trunk, takes; place around the axis of rotation which is located in the rear area which is the lower one in the vertical extension of the trunk lid. This pivoting motion collides with this lower trunk seal which runs transversely. Furthermore, the stability of shape of the seven-jointed scissors lifting arrangement under laterally acting forces on the trunk lid is not optimum. Therefore, to counter this system-induced defect, the scissors lifting arrangement must be very durable and thus very heavy. On the other hand, to achieve high operating precision and accuracy of fit, high production cost must be borne in this construction.

SUMMARY OF THE INVENTION

Therefore, a primary object of this invention is to devise a tailgate of the initially mentioned type which has a simple and still reliable pivoting mechanism.

This object is achieved by the tailgate of a motor vehicle which can be selectively pivoted as the trunk lid around a front pivot axis by means of a front four-bar mechanism which has two levers or can be pivoted as the lid of a roof receiver for the folding roof around a rear pivot axis by means of a rear four-bar mechanism which has two levers, a common lever being part of both the front four-bar mechanism and the rear four-bar mechanism.

Since the second lever of the front four-bar mechanism which is hinged between the body and the tailgate is, at the same time, a lever of the rear four-bar mechanism, only three levers are necessary to form two four-bar mechanisms, the front four-bar mechanism being formed by the first and second lever and the rear four-bar mechanism being formed by the second and third lever. Another advantage is that, by driving the second lever, pivoting around the front four-bar mechanism and also pivoting around the rear four-bar mechanism can take place.

This arrangement makes possible a simple mechanical structure in which, even at low production cost, high precision and good functionality are obtained. Furthermore, it is possible to effect lifting of the tailgate vertically relative to the sealing lip by respective use of a four-bar mechanism for the two pivoting motions so that collision with the seal which seals the opening of the trunk is prevented. Thus sealing of the trunk can be made simpler.

Since the support of the tailgate by means of the front and rear four-bar mechanism represents mechanical redundancy, in the selective pivoting of the front or the rear four-bar mechanism, it is always the inactive four-bar mechanism which is decoupled or deactivated. Therefore, the aforementioned embodiment is especially advantageous since, in this arrangement, either for pivoting around the front four-bar mechanism only the third lever of the rear four-bar mechanism, or for pivoting around the rear four-bar mechanism only the first lever of the front four-bar mechanism, must be released on one of its two joints.

In another embodiment, there is a connecting rod, especially in the form of a support lever, between the first lever and the third lever, and it easily keeps in position the respectively released or inactive first or third lever during respective pivoting either around the front or the rear four-bar mechanism.

Furthermore, it is advantageous in this arrangement that, with simultaneous locking of both the first lever and the third lever via a front lock mechanism and a rear lock mechanism, respectively, the tailgate can be kept in the closed state based on mechanical redundancy.

Preferably, the stowage space cover is connected to the connecting rod (support lever), being either securely joined thereto or being attached to the connecting rod with a capacity to turn or pivot.

These and further objects, features and advantages of the present invention will become apparent from the following description when taken in connection with the accompanying drawings which, for purposes of illustration only, show several embodiments in accordance with the present invention.

DETAILED DESCRIPTION OF THE INVENTION

Figure 1:
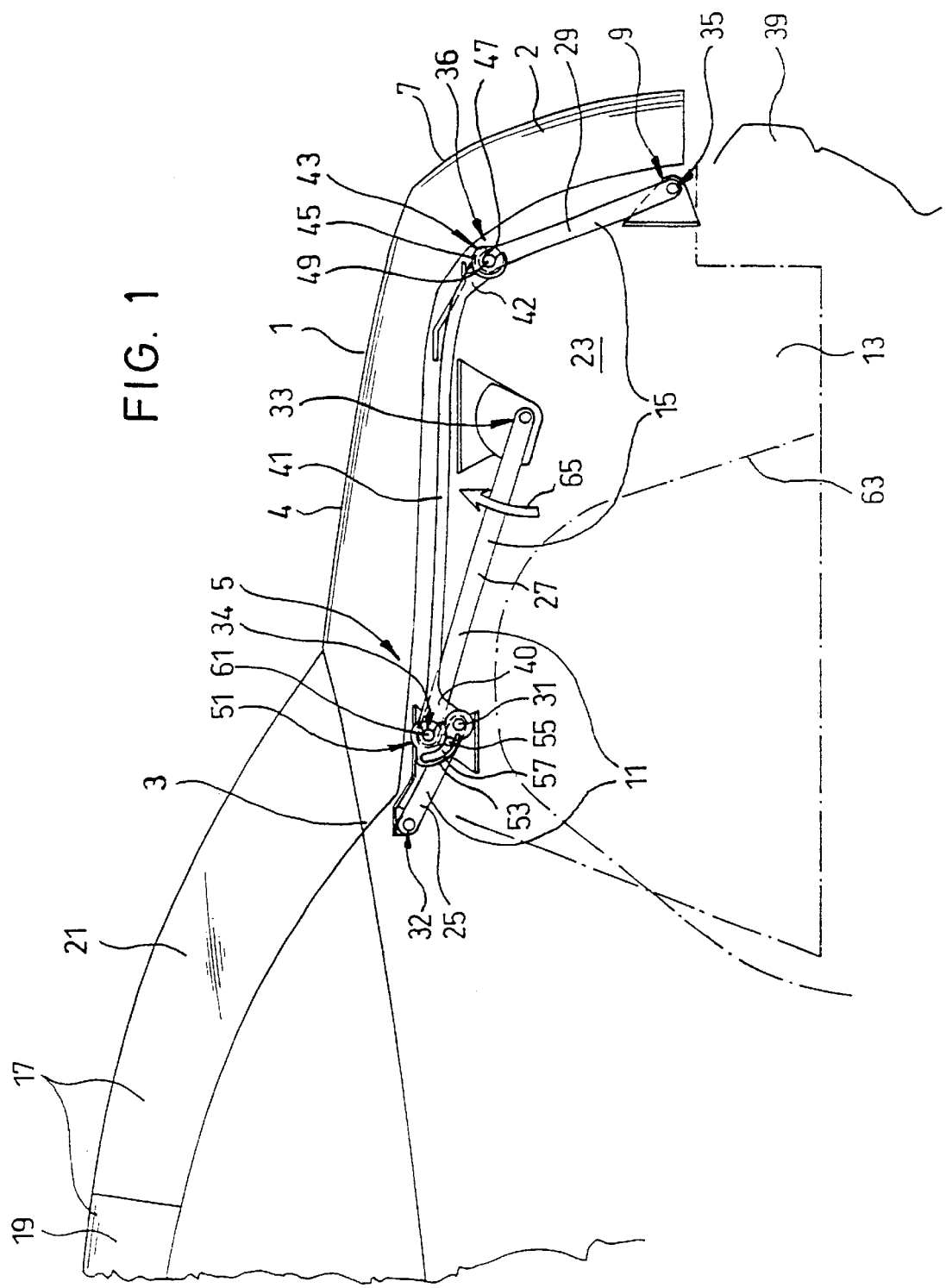
FIG. 1 is a side view of a vehicle rear with a tailgate in which the tailgate is in the closed position.
Figure 2:
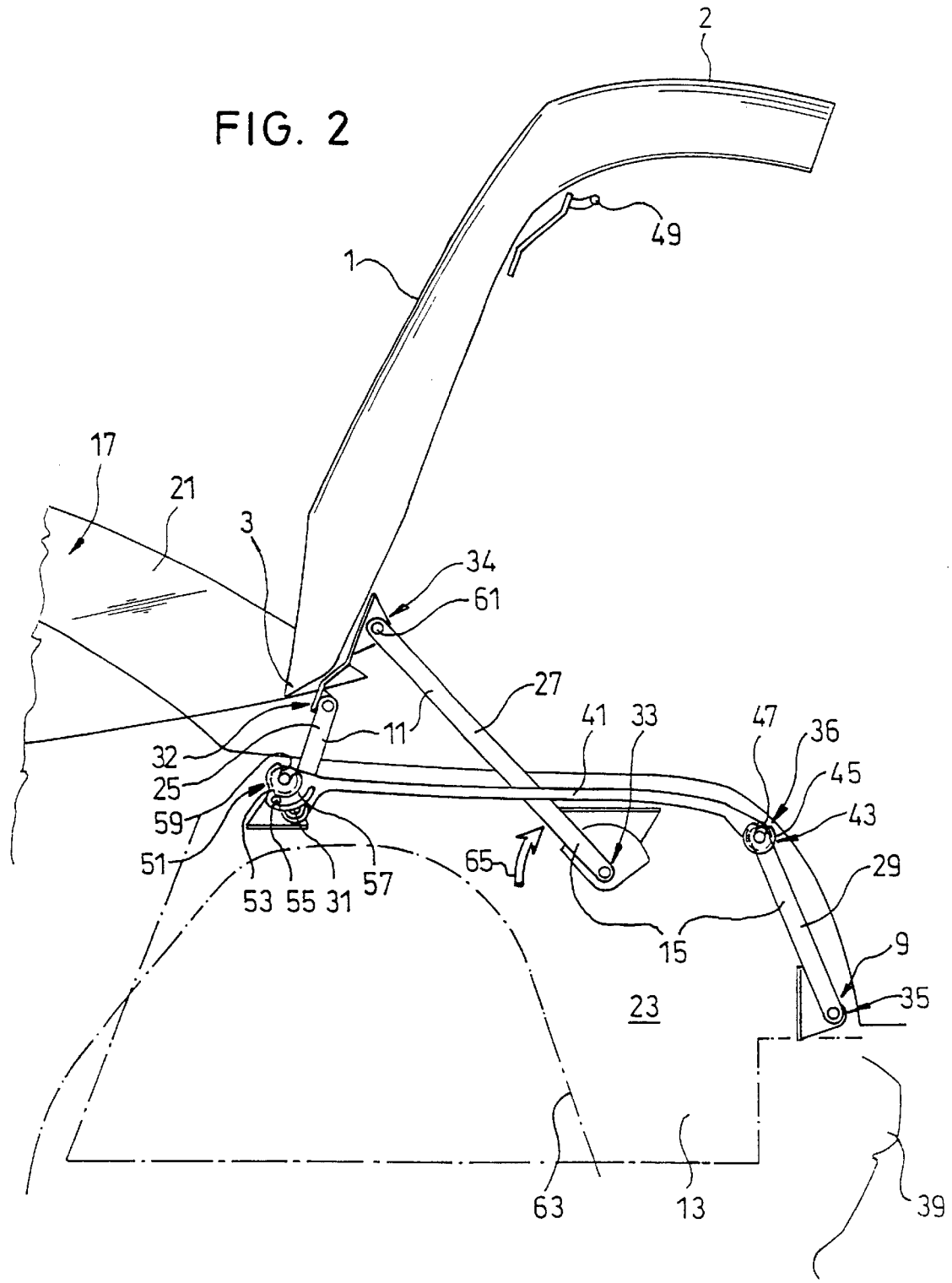
FIG. 2 is a side view of a motor vehicle rear with a tailgate in which the tailgate is pivoted around a front four-bar mechanism in order to enable access to the trunk.
Figure 3:
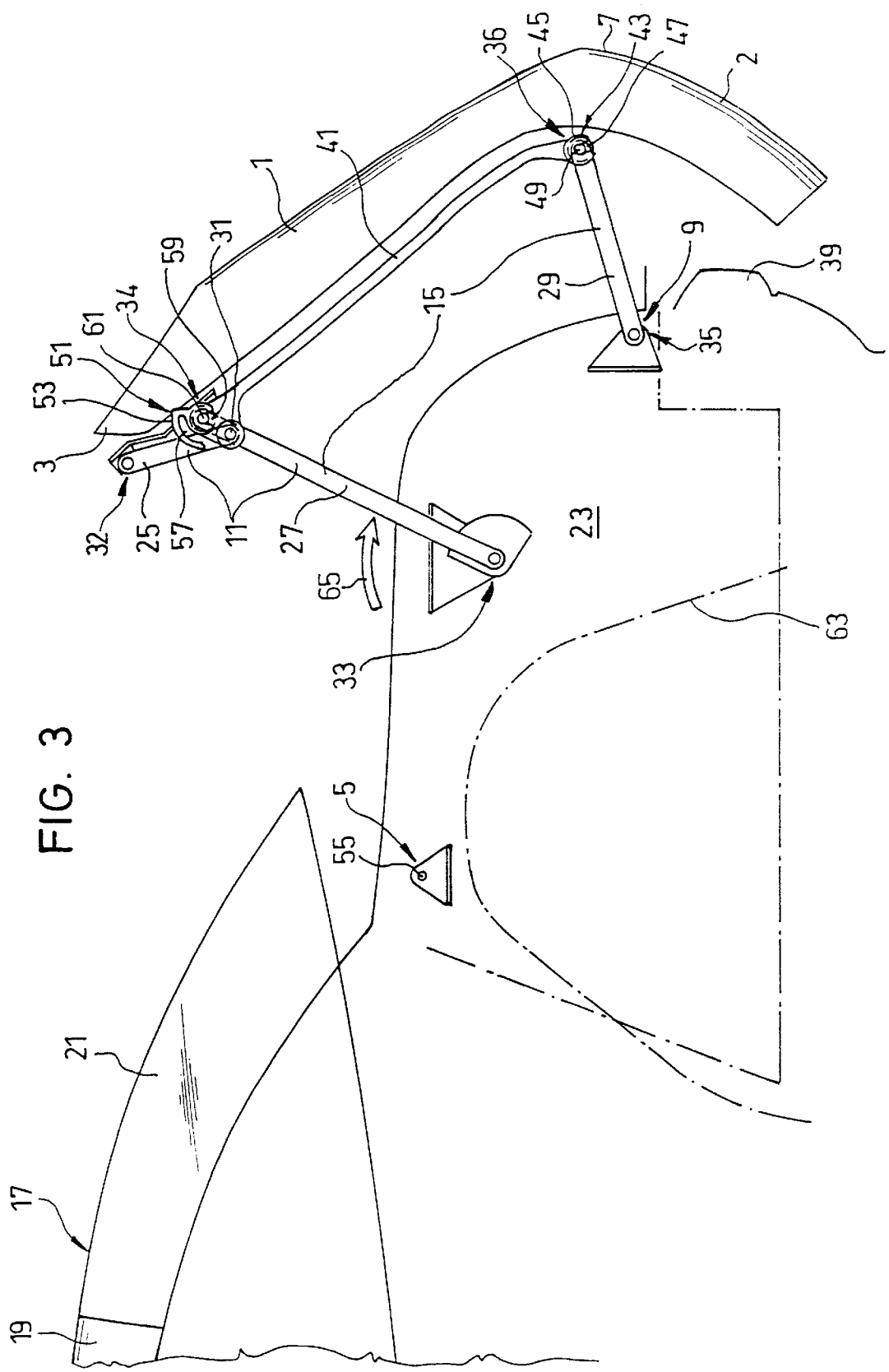
FIG. 3 is a side view of a motor vehicle rear with a tailgate in which the tailgate is pivoted around a rear four-bar mechanism in order to stow the folded-together folding roof.

FIGS. 1 to 3 show the rear part of a motor vehicle in a side view, in the drawings the front end being on the left and the back end of the motor vehicle being on the right.

The motor vehicle has a tailgate 1 which can be selectively pivoted as a trunk lid around a front pivot axis 5 which is located near its front edge 3 or around a rear pivot axis 9 which is located near its rear edge 7 as the lid of a receiver for a folding roof. At the front pivot axis 5, a front four-bar mechanism 11 is formed between the tailgate 1 and the body 13, and at the rear pivot axis 9, a rear four-bar mechanism 15 is formed between the body 13 and the tailgate 1. In the area of the front edge 3, a roof structure 17 is attached which comprises a roof element 19 which can be attached to the top edge of the windshield (not shown) and a rear window element 21 which is coupled to the roof element 19. This roof structure 17 is coupled adjacent to the front edge 3 of the tailgate to the body 13, can be folded together via a forced control (not shown) and can be stowed in the trunk 23 near the tailgate 1 which is pivoted in around the rear pivot axis 9.

FIG. 1 shows the tailgate 1 in the closed position. The tailgate 1 covers the trunk 23 which is used selectively as a stowage space for baggage and/or the folded-together roof structure 17. The front four-bar mechanism 11 which is located in the front area of the tailgate 1 comprises a first lever 25 which is coupled via a first joint 31 to the front end section 40 of a support lever 41 and via a second joint 32 to the tailgate 1, and a second lever 27 which is coupled via a third joint 33 to the body 13 and via a fourth joint 34 to the tailgate 1. The first joint 31 is located near the front end area of the tailgate 1 and the second joint 32 is located in front of and somewhat above the first joint 31 near the front edge 3. The third joint 33 is located in a middle section of the lengthwise extension of the trunk 23 somewhat below the first joint 31 and the fourth joint 34 is located in the front end area of the tailgate 1 somewhat above and in front of the first joint 31. The second lever 27 is roughly three times longer than the first lever 25.

The rear four-bar mechanism 15 comprises the second lever 27 and a third lever 29 which is oriented roughly vertically in the back end area of the trunk 23 and which is coupled via a fifth joint 35 to the body 13 and via a sixth joint 36 to the rear end section 42 of the support lever 41. In the back end area, the tailgate 1 has a section 2 which is sloped obliquely upward and forward and which extends down into the vicinity of a shock absorber 39. The third lever 29 extends on the inside of the trunk 23 roughly parallel and adjacent to this section 2 of the tailgate 1, the fifth joint 35 being located near the lower edge of the section 2, adjacent to the shock absorber 39, and the sixth joint 36 being located in the rear upper area of the trunk 23.

Figure 4:
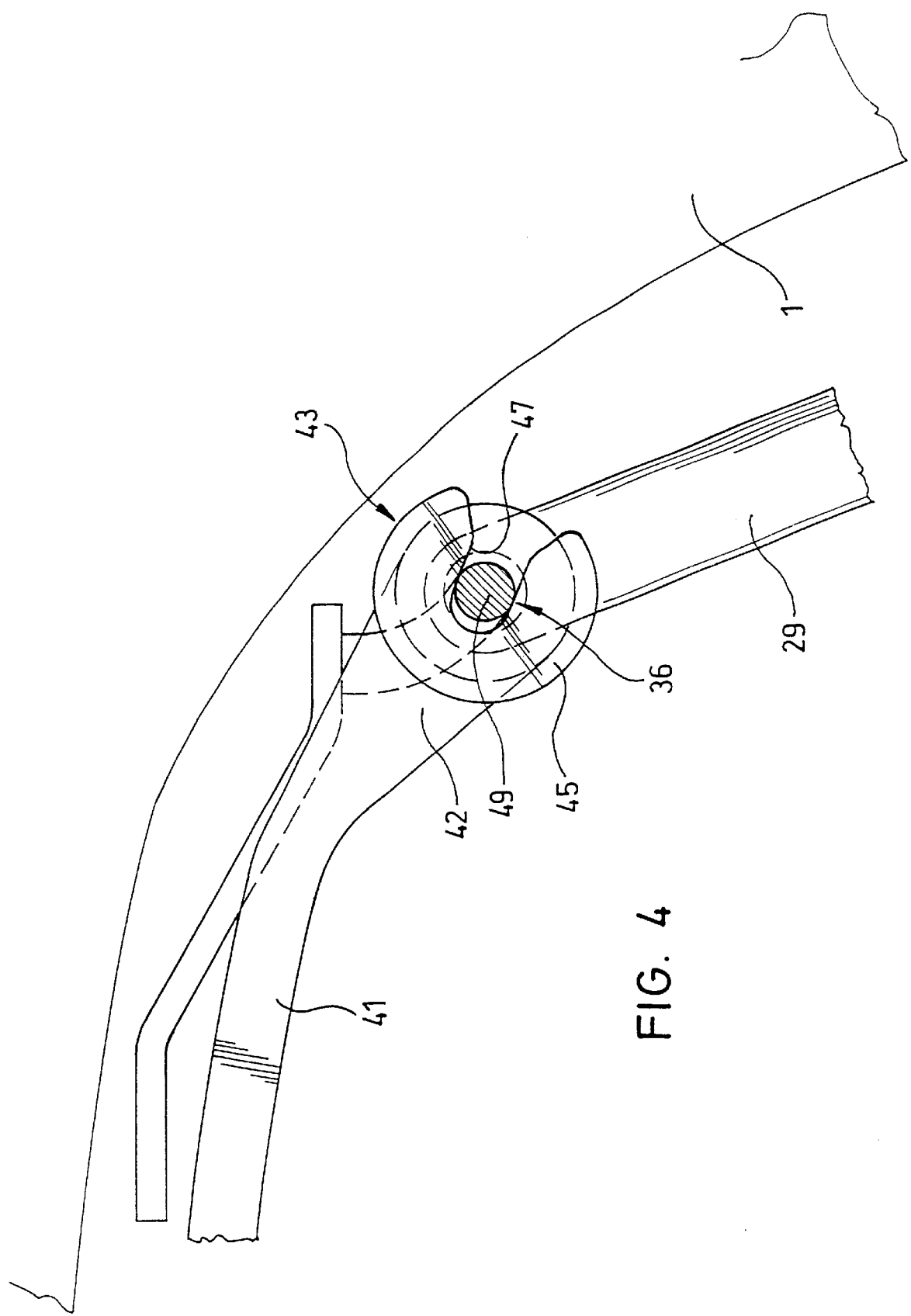
FIG. 4 is an enlarged detailed view of a first lock area.

Between the first joint 31 and the sixth joint 36 is located the support lever 41 underneath and lateral of the horizontal section 4 of the tailgate 1 with the tailgate 1 closed roughly parallel to the horizontal section 4. The sixth joint 36 is detachably joined via the rear lock mechanism 43 to the tailgate 1 (see also FIG. 4). The rear lock mechanism 43, concentrically with respect to the axis of rotation around the sixth joint 36, has a rotary disk 45 which is provided with a radial slot 47, and a pin 49 which is located on the tailgate 1 and which can be inserted into the slot 47 when the tailgate is being pivoted around the front four-bar mechanism 11. To keep the tailgate 1 in the position which is shown in FIG. 1, the disk 45 is turned, the disk 45 together with the sixth joint 36 being locked to the pin 49 and thus to the tailgate 1. The rear lock mechanism 43 can accordingly assume two positions, in the first position the sixth joint 36 being joined to the tailgate 1 and in the second position the sixth joint 36 being released relative to the tailgate 1. If the rear lock mechanism 43 is in the unlocked position, the sixth joint 36 together with the disk 45 and the third lever 29 is held by the support lever 41 in position relative to the pin 49.

Figure 5:
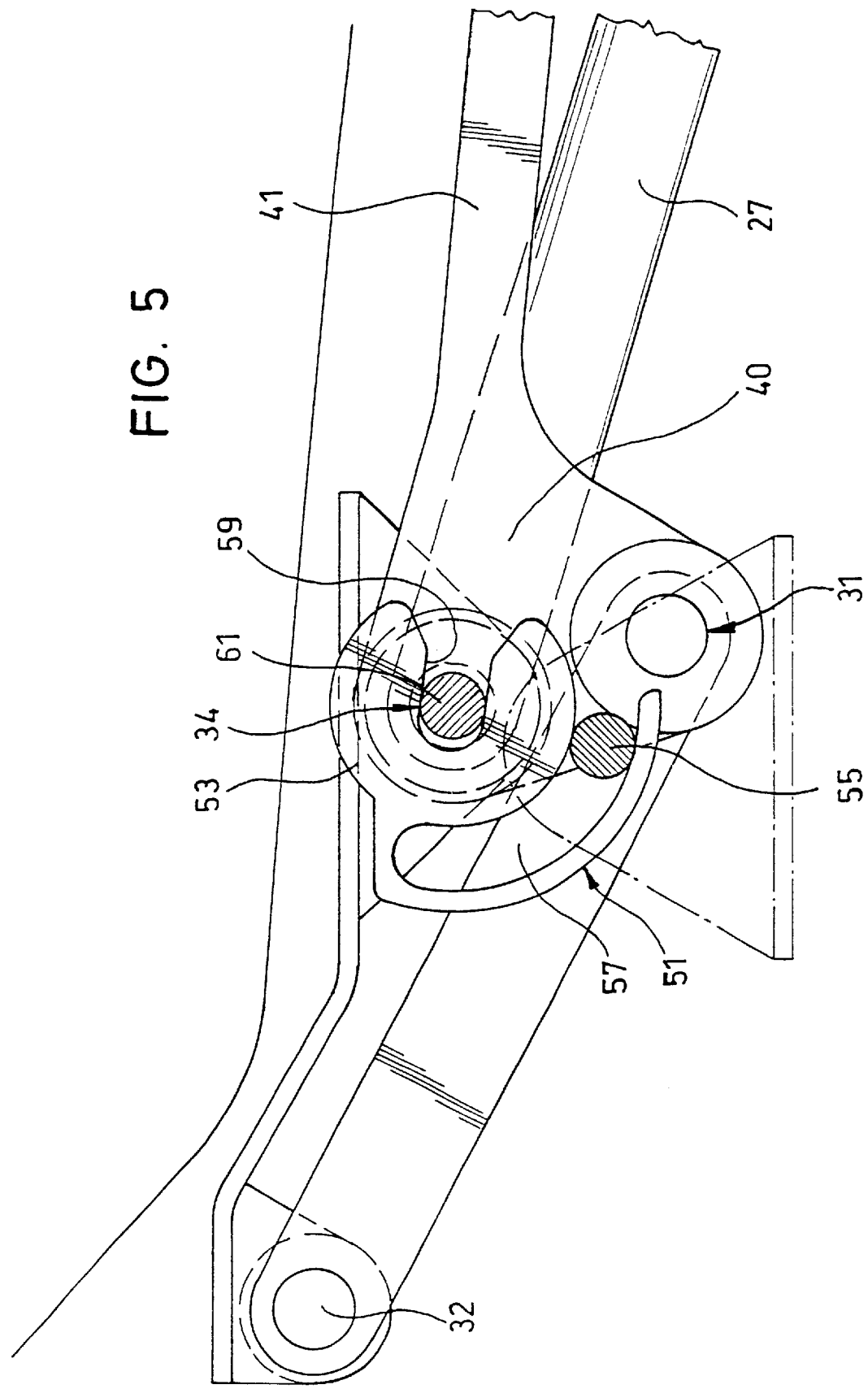
FIG. 5 is an enlarged detailed view of a second lock area.

The first joint 31 is detachably connected to the body 13 via the front lock mechanism 51. The front lock mechanism 51 has a lock disk 53 which is located on the extension of the front end section 40 of the support lever 41 such that the pivot of the lock disk 53 comes to rest concentric to the axis of rotation of the fourth joint 34 when the tailgate 1 is in the closed state (see also FIG. 5). The lock disk 53 has a circular slot 57 concentric to its pivot. Furthermore the front lock mechanism 51 has a pin 55 which is attached to the body and which, with the tailgate 1 closed, can be engaged and disengaged from the circular slot 57 on the lock disk 53 by alternate-side rotary motion of the lock disk 53.

The lock disk 53 is additionally provided with a radial slot 59 which can be engaged and disengaged from another pin 61 which is located on the tailgate 1 as an extension of the axis of rotation of the fourth joint 34 by alternate-side rotary motion of the lock disk 53.

Thus, the front lock mechanism 51 can assume three positions. In the first position, the first joint 31 is connected via the support lever 41 to the body 13, and likewise, via the support lever 41 to the tailgate 1 (FIG. 1); in the second position, the first joint 31 is connected via the support lever 41 to the body 13 and the support lever 41 is detached relative to the tailgate 1 (FIG. 2); and in the third position, the support lever 41 together with the first joint 31 is detached relative to the body 13 and is connected to the tailgate 1 (FIG. 3).

The locking function of the radial slot 59 of the lock disk 53 with the pin 61 which is attached to the tailgate 1 is an additional function in order, on the one hand, to ensure reliable closure of the tailgate 1 when it is closed, and on the other, to keep the first joint 31 reliably in position when the tailgate 1 is pivoted around the rear four-bar mechanism 15, i.e., when the first joint 31 is released relative to the body 13. Normally, the support lever 41 is sufficient to keep the first joint 31, which has been released from the body 13, in position since there is mechanical redundancy which keeps the tailgate 1 in the closed position when the first joint 31 is locked relative to the body 13 and the sixth joint 36 is locked relative to the tailgate 1.

The rear four-bar mechanism 15 and the front four-bar mechanism 11 share the second lever 27 so that, when the tailgate 1 pivots around the rear four-bar mechanism 15, the connection of the first lever 25 between the body 13 and the tailgate 1 must be released or when the tailgate 1 pivots around the front four-bar mechanism 11, the connection of the third lever 29 between the body 13 and the tailgate 1 must be released. Pivoting movements around the rear or around the front four-bar mechanism can thus take place by driving the second lever 27. In this way, actuation is clearly simplified as compared to known mechanisms since only a single lever need be driven via a single drive in order to achieve the different opening positions of the tailgate 1.

The above described mechanism is located both on the right and on the left side of the motor vehicle in the trunk above the wheel housing 63.

The course of operation when the tailgate 1 is pivoted out of its closed position as shown in FIG. 1 around the front four-bar mechanism 11 into the opened position of the tailgate 1 as shown in FIG. 2 is described below. First of all, the rear lock mechanism 43 is moved from its first position (FIG. 1) in which the sixth joint 36 is connected to the tailgate 1 into its second position (FIG. 2) in which the sixth joint 36 is released relative to the tailgate 1. Furthermore, the front lock mechanism 51 is moved from the first position (FIG. 1), in which the first joint 31 is connected via the support lever 41 to the body 13, and likewise, via the support lever 41 to the tailgate 1, into the second position (FIG. 2) in which the first joint 31 is connected to the body 13 via the support lever 41 and the support lever 41 is released relative to the tailgate 1. Then, the second lever 27 is turned clockwise by means of an electric motor drive or hydraulic drive 65 around the third joint 33 so that the tailgate 1 is pivoted around the front four-bar mechanism 11 into the opened position in which the trunk 23 becomes accessible from the back of the vehicle for loading baggage. Closure of the tailgate 1 takes place in the reverse sequence.

The course of operation is described below for pivoting of the tailgate 1 out of its closed position as shown in FIG. 1 around the rear four-bar mechanism 15 into the opened position of the tailgate 1 as shown in FIG. 3, in which stowage of the folded-together roof structure 17 in the trunk 23 is possible. In doing so, the rear lock mechanism 43 remains in its first position (FIG. 1) in which the sixth joint 36 is connected to the tailgate 1. Furthermore, the front lock mechanism 51 is moved from the first position (FIG. 1), in which the first joint 31 is connected via the support lever 41 to the body 13 and likewise via the support lever 41 to the tailgate 1, into the third position (FIG. 3) in which the support lever 41 together with the first joint 31 is released relative to the body 13 and is joined to the tailgate 1. Then, the second lever 27 is turned clockwise by means of the drive 65 around the third joint 33 so that the tailgate 1 is pivoted around the rear four-bar mechanism 15 into the opened position in which the trunk 23 becomes accessible from the front as a stowage space for stowage of the folded-together roof structure 17. Closure of the tailgate 1 takes place in the reverse sequence.

The rotary motion of the drive 65 around the second lever 27, both around the front four bar mechanism 11 and also around the rear four-bar mechanism 15, can be supported by a gas compression spring or the like.

The support lever 41 which forms the connecting rod is used as a positioning means for the respectively released hinged end side of the first lever 25 or the third lever 29. The released first or third lever 25 and 29, respectively, could also be kept in position, for example, by a clamping means which has been pretensioned by a spring while it is stationary.

In the existing structure, the roof structure 17 is made as one from a roof part 19 and a solid rear window part 21 which are hinged to one another in the manner of the Mercedes Benz® model 230 SLK sold in U.S. the commencing with the 1998 model year (commencing in 1997) and continuing at least through 2000 model year. The roof structure 17 can also be made in some other way from roof parts which are coupled to one another or as a material construction which can be folded together.

Figure 6:
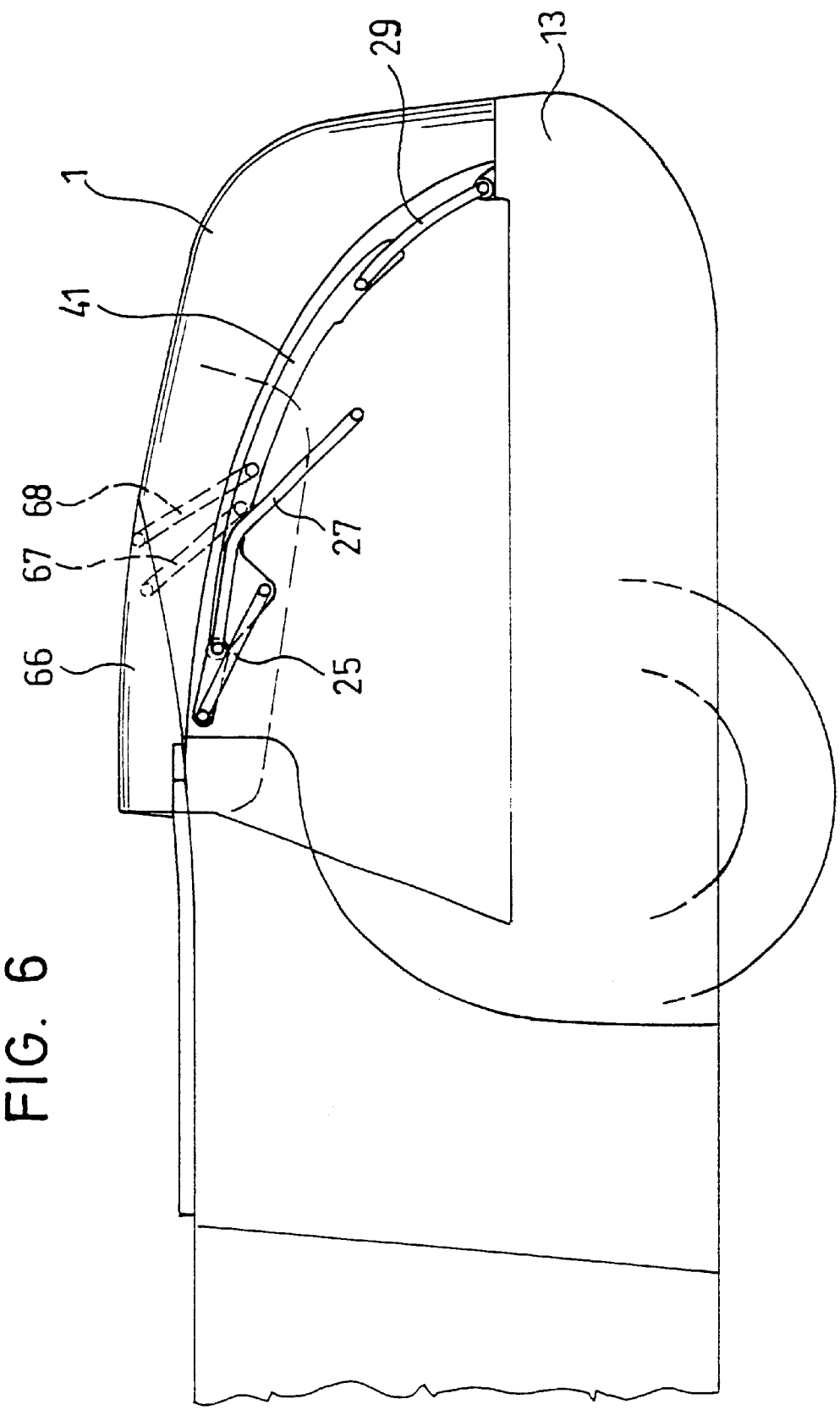
FIGS. 6–8 are views corresponding to those of FIGS. 1 to 3 in accordance with a modified embodiment.
Figure 7:
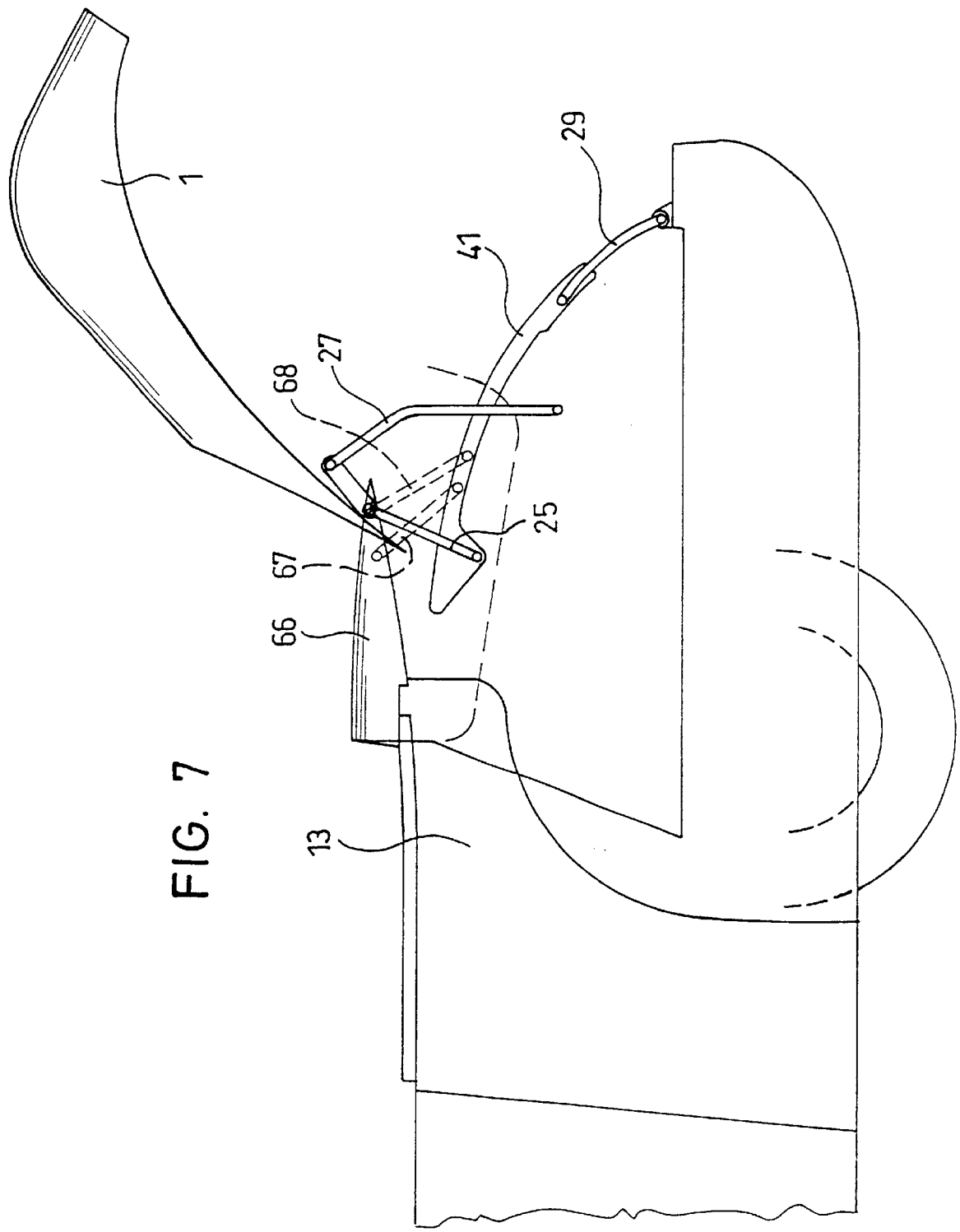
Figure 8:
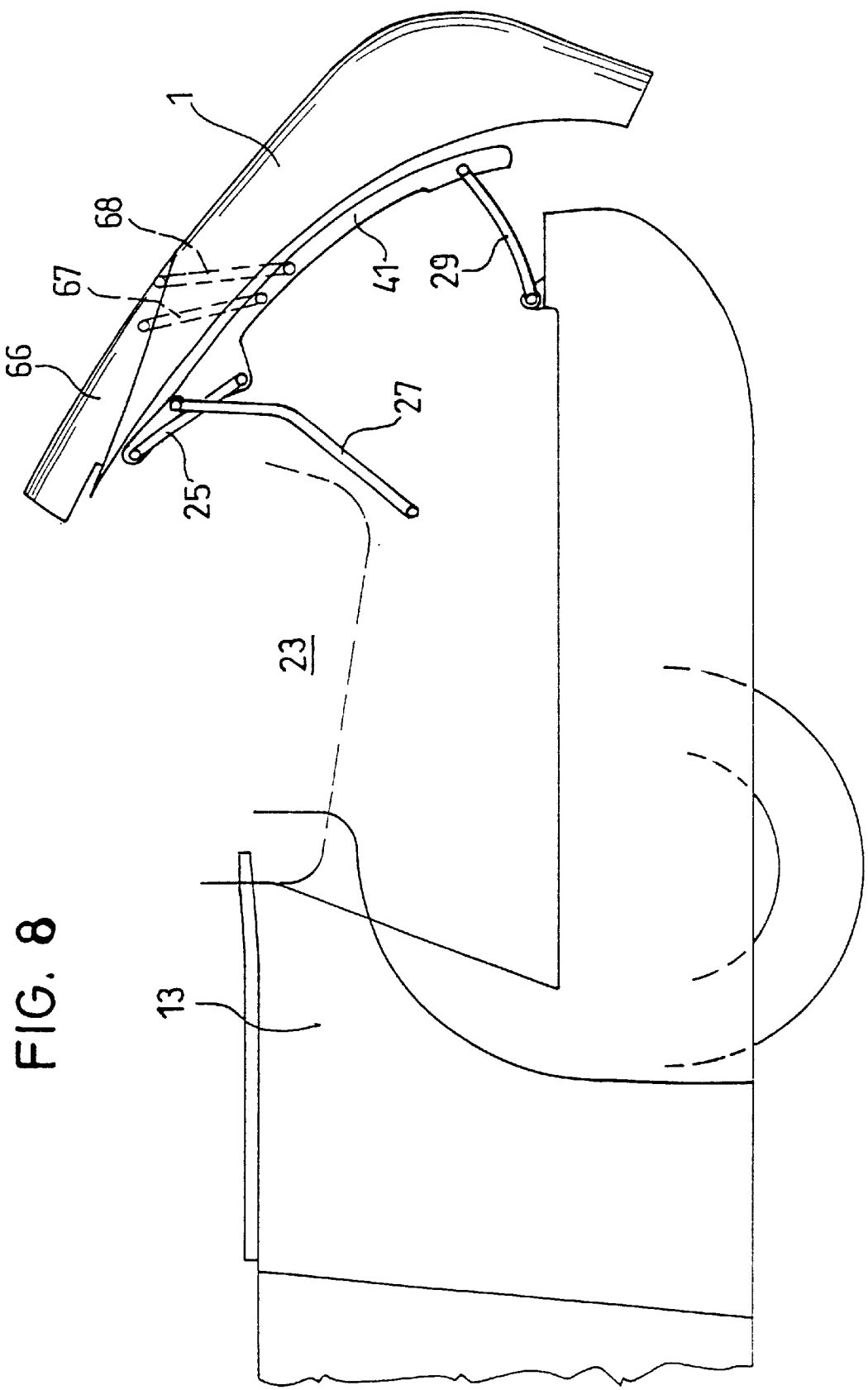

As is illustrated in FIGS. 6 to 8, analogously to the open or closed position of the tailgate 1 shown in FIGS. 1 to 3, a front stowage space cover 66 (which is used as a hat shelf in front of the rear window when the vehicle roof is closed), in the embodiment shown, is solidly connected via two rigid holding devices 67 and 68 to the support lever 41 which forms the connecting rod so that when the tailgate 1 is closed (FIG. 6) or when the tailgate 1 is opened as the trunk lid (FIG. 7), the connecting rod, and thus cover 66, remains unchanged in its position. Conversely, the stowage space cover 66, when the stowage space 23 is exposed with the connecting rod coupled in this case to the tailgate 1 in the form of a support lever 41, pivots so that the stowage space 23 is fully accessible in its front area without additional mechanisms for the cover 66. Instead of a rigid connection to the connecting rod or to the support lever 41, alternatively, a pivoting connection of the stowage space cover 66 to the support lever 41 can be provided.

While various embodiments in accordance with the present invention have been shown and described, it is understood that the invention is not limited thereto, and is susceptible to numerous changes and modifications as known to those skilled in the art. Therefore, this invention is not limited to the details shown and described herein, and includes all such changes and modifications as are encompassed by the scope of the appended claims.

What is claimed is:

1. Tailgate of a motor vehicle, comprising a trunk lid, a front four-bar mechanism which has two levers by which the trunk lid is selectively pivotable around a front pivot axis relative to a vehicle body, and a rear four-bar mechanism which has two levers by which the trunk lid is pivotable around a rear pivot axis relative to the vehicle body as a stowage space cover for a folding roof; wherein a lever of the front four-bar mechanism is also a lever of the rear four-bar mechanism.

2. Tailgate as claimed in claim 1, wherein one lever of the front four-bar mechanism and one lever of the rear four-bar mechanism are interconnected by a connecting rod.

3. Tailgate as claimed in claim 2, wherein there is at least one locking element on the connecting rod by means of which the connecting rod is at least temporarily held relative to the vehicle body.

4. Tailgate as claimed in claim 1, wherein the front four-bar mechanism has a first lever which is coupled via a first joint to the vehicle body and via a second joint to the tailgate, and has a second lever which is coupled via a third joint to the vehicle body and via a fourth joint to the tailgate; and wherein the rear four-bar mechanism also comprises the second lever and has a third lever which is coupled via a fifth joint to the vehicle body and via a sixth joint to the tailgate.

5. Tailgate as claimed in claim 4, wherein, with the tailgate closed, the first joint is located near a front end area of the tailgate, the second joint is located in front of the first joint, the third joint is located in a middle section of the lengthwise extension of the trunk covered by the tailgate, the fourth joint is located in the front end area of the tailgate, the fifth joint is located in a rear lower end area of the trunk, and the sixth joint is located in a rear upper end area of the trunk.

6. Tailgate as claimed in claim 4, wherein, for pivoting of the tailgate around the front four-bar mechanism, either the sixth joint is releasable relative to the tailgate or the fifth joint is releaseable relative to the body; and wherein, to pivot the tailgate around the rear four-bar mechanism, either the second joint is releaseable relative to the tailgate or the first joint is releaseable relative to the body.

7. Tailgate as claimed in claim 4, wherein both pivoting motion of the front four-bar mechanism and also pivoting motion of the rear four-bar mechanism are produced by driving of said second lever.

8. Tailgate as claimed in claim 7, wherein the first joint and the sixth joint are hinged to one another via the connecting rod for pivoting around the front four-bar mechanism, the sixth joint being released via a rear lock mechanism relative to the tailgate and the first joint being connected via a front lock mechanism to the vehicle body, and for pivoting around the rear four-bar mechanism, the fourth joint being released via the front lock mechanism relative to the body and the sixth joint being connected via the rear lock mechanism to the tailgate.

9. Tailgate as claimed in claim 8, wherein the tailgate is kept in a closed position when the front and rear lock mechanisms are locked.

10. Tailgate as claimed in claim 8, wherein the rear lock mechanism has first and second positions, in the first position the sixth joint being connected via the connecting rod to the tailgate and in the second position the sixth joint being released relative to the tailgate.

11. Tailgate as claimed in claim 8, wherein the second lock mechanism has first second and third positions, in the first position the first joint being connected via the connecting rod to the vehicle body and to the tailgate, in the second position the first joint being connected via the connecting rod to the vehicle body and being released relative to the tailgate, and in the third position the first joint being released via the connecting rod relative to the vehicle body and being connected to the tailgate.

12. Tailgate as claimed in claim 2, wherein the stowage space cover is connected to the connecting rod.

13. Tailgate as claimed in claim 12, wherein the stowage space cover is solidly connected to the connecting rod.

14. Tailgate as claimed in claim 12, wherein the stowage space cover is pivotably or rotatably attached to the connecting rod.

* * * * *